C. R. RADCLIFFE.
POWER TRANSMITTING APPARATUS.
APPLICATION FILED AUG. 11, 1916.

1,270,323.

Patented June 25, 1918.
2 SHEETS—SHEET 1.

WITNESS

INVENTOR.
C. R. Radcliffe
BY
his ATTORNEY

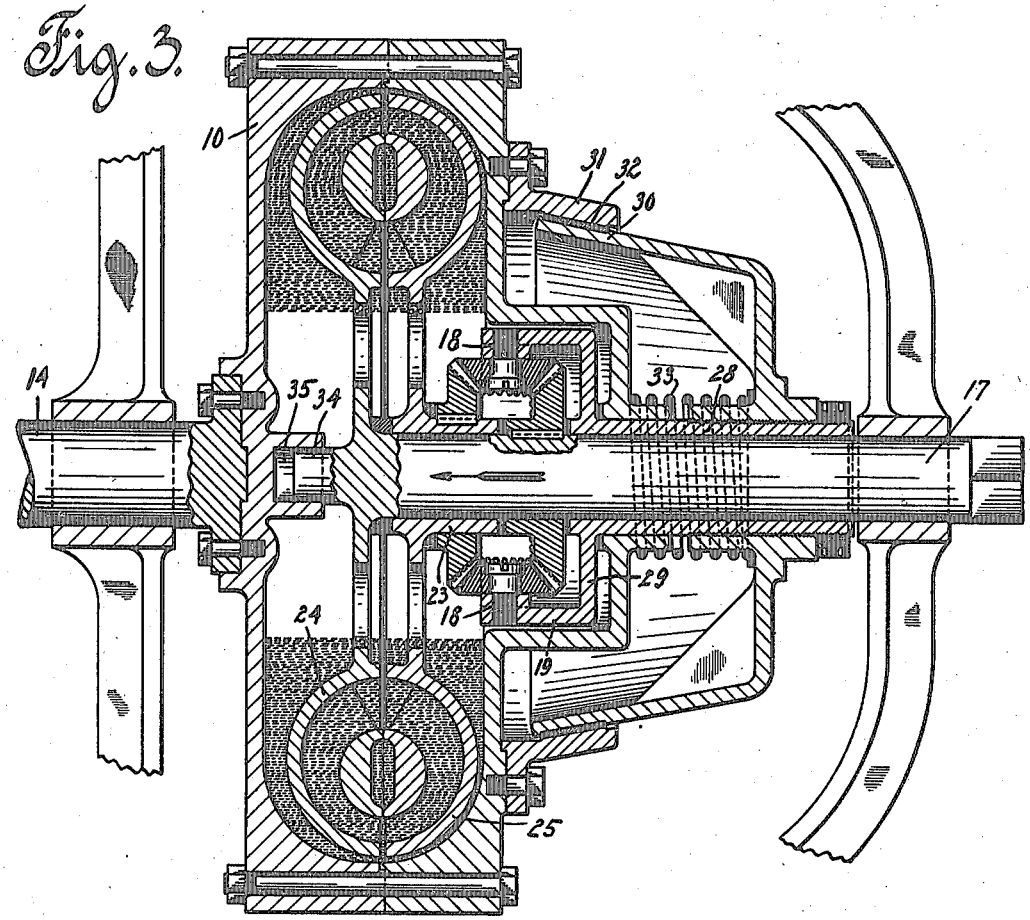

UNITED STATES PATENT OFFICE.

CARLTON R. RADCLIFFE, OF NEW YORK, N. Y.

POWER-TRANSMITTING APPARATUS.

1,270,323.            Specification of Letters Patent.     Patented June 25, 1918.

Application filed August 11, 1916. Serial No. 114,413.

*To all whom it may concern:*

Be it known that I, CARLTON R. RADCLIFFE, a citizen of the United States, and a resident of the city of New York, in the county of New York and State of New York, have invented certain new and useful Improvements in Power-Transmitting Apparatus, of which the following is a specification.

The present invention relates to a power transmitting mechanism. It pertains more particularly to devices of the type known as "planetary gear power transmitting apparatus." In these devices power is transmitted from a driving shaft or member to a driven shaft or member by a train of gears, the transmitting mechanism becoming operative as soon as one or more of the elements of the train are caused to change their normal speed relative to the other elements thereof. For the purpose of effecting such change in speed, manually operated means are usually employed, which in most of the cases require more or less careful manipulation.

The main object of the present invention is to provide automatic means for effecting the required change in speed between the elements of the planetary gear, thereby permitting the driving member to impart, without shock or jar, rotation to the driven member.

With these and other objects in view, which will more fully appear as the nature of the invention is better understood, the same consists in the combination, arrangement, and construction of parts hereinafter described, pointed out in the appended claims and illustrated in the accompanying drawings, it being understood that many changes may be made in the size and proportion of the several parts and details of construction within the scope of the appended claims without departing from the spirit or sacrificing any of the advantages of the invention.

Two of the many possible embodiments of the invention are illustrated in the accompanying drawings, in which:—

Figure 1:
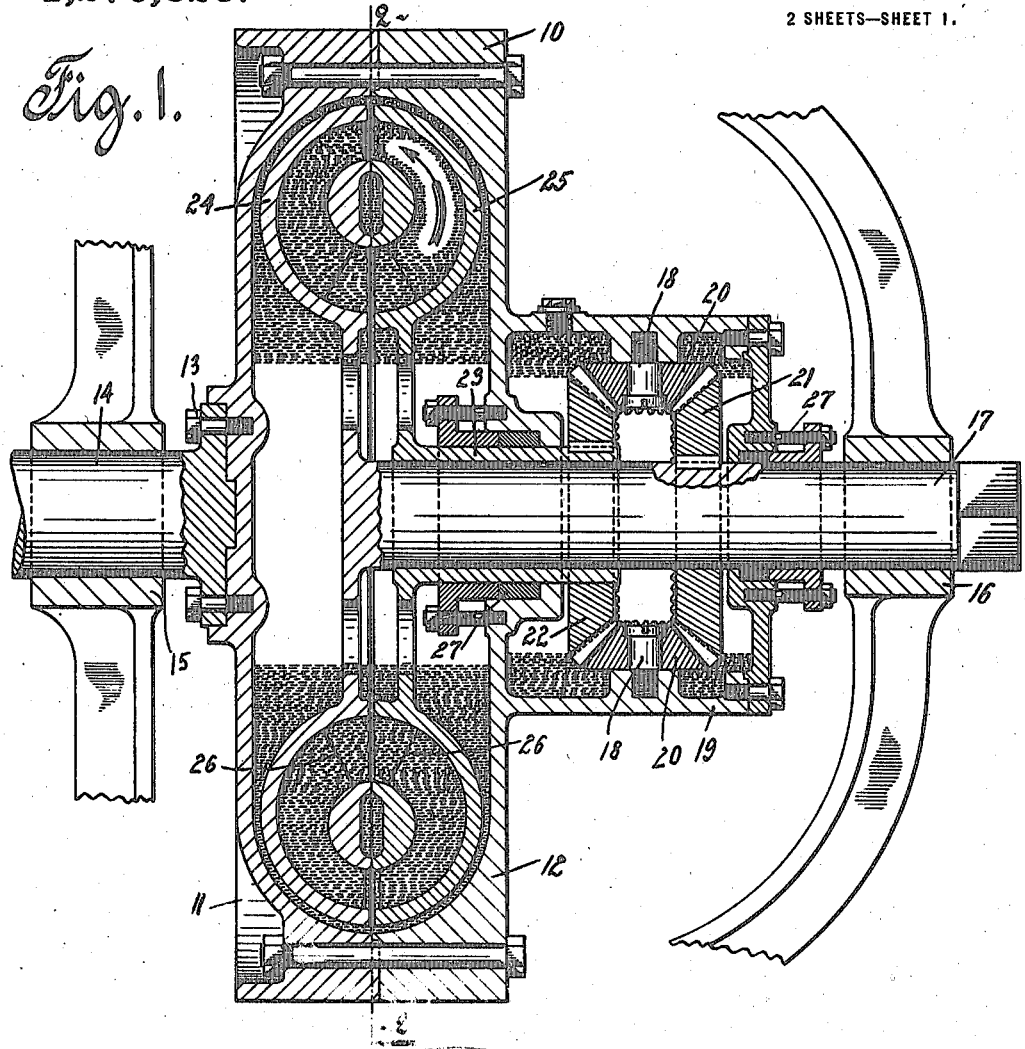
Figure 2:
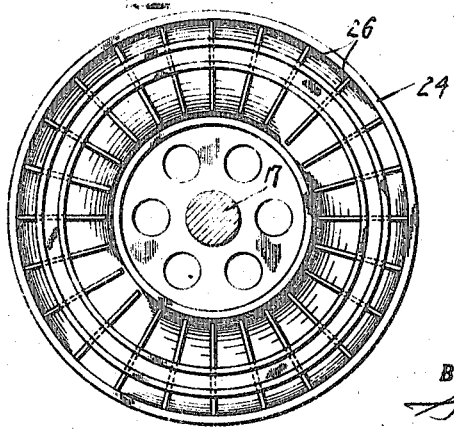

Figure 1 is a central horizontal section taken through a power transmitting apparatus constructed in accordance with this invention; Fig. 2 is a section taken on line 2—2 of Fig. 1, on a smaller scale; and Fig. 3 is a central horizontal section taken through a modified apparatus.

Referring now more particularly to Figs. 1 and 2 of the drawings, the numeral 10 indicates a casing, made of two parts 11 and 12, which are suitably bolted together. This casing is attached, for instance, by screws 13 to a driving shaft 14, for instance the crank shaft of an internal combustion engine. This shaft is journaled in one or more bearings 15. In alinement with the bearings 15 is disposed a bearing 16, in which is rotatably mounted the driven shaft 17 of the mechanism.

The connection between the driving and driven shafts is made by a planetary gearing, comprising, in the case illustrated in the drawings, a plurality of bevel gears, connected with the driving and driven shafts in a manner presently to be described. The gearing herein disclosed is shown for purposes of illustration only, as gears of other types may just as well be combined with the mechanism hereinafter to be fully specified. The gearing comprises two spindles 18, which are disposed upon diametrically opposite portions of a carrier or gear box 19, and have each loosely mounted thereon a bevel pinion 20, which constitute the planet gears of the transmission. The carrier 19 is caused to rotate with the casing 10 and is, in the present case, for this purpose made integral therewith. These planet gears mesh with bevel gears 21 and 22, the gear 21 being keyed to the driven shaft 17 and the gear 22 being keyed or otherwise fixed to a sleeve 23, that is drawn over the said driven shaft, and is adapted to rotate thereon. The axes of gears 21 and 22 are in alinement and are disposed at right angles to the longitudinal axes of the spindles 18, as clearly appears from Fig. 1 of the drawings. In this manner a planetary gearing of the well-known type is formed, said gearing being combined with means which has a tendency to retard the rotative speed of the sleeve 23 as rotation is imparted to the same by the driving shaft through the intermediary of the planetary gearing. This means comprises, in the case illustrated, a hydraulic clutch, including two heads 24 and 25, which are alike or similar in design, the former being made integral with or fixedly attached to the driven shaft 17 and the head 25 being carried by the sleeve 23. The two heads are disposed within the casing 10, and comprise each a structure closely resembling that of the runner of a centrifugal pump impeller, provided with straight radially extending blades 26. These heads are mounted relative to each other in a manner that the liquid discharged by one of the same is adapted to flow into the other member of the set. The casing 10 is either partly or wholly filled with a suitable liquid, which, as the casing is rotated, flows from the faster moving head into the slower one, more particularly the faster moving head will discharge the liquid in jets or streams near its periphery, said jets flowing into the slower moving head, which discharges the liquid at its eye, wherefrom it is drawn into the eye of the faster moving head.

The carrier 19 is made, in the case illustrated in the drawings, in the form of a gear box, which may be filled with a suitable lubricating material, stuffing boxes 27 being associated with said gear box for the well-known purpose.

The operation of this device is as follows:—The operation of the mechanism will best be understood by assuming that a load is applied to the driven shaft. If rotation is imparted to the driving shaft, the carrier 19 and the planet gears 20 thereon will rotate with the said casing. Inasmuch as the planet gears are in mesh with the bevel gear 21 and the latter is stationary, the said planet gears will rotate around their own axes and bodily around the axis of the driven shaft. The stationary gear 21 acts as a fulcrum for the said planet gears and the latter, being in mesh with the bevel gear 22, that is attached to the sleeve 23, will rotate the bevel gear 22 in the direction of the rotation of the driving shaft 14 at a speed that is, in the form shown, twice that of said driving shaft. Due to this motion the liquid in the head 25 is moved toward its periphery and thrown against the blades of the head 24. These blades, being stationary, act as an abutment in the same manner as the stationary casing of a hydraulic brake. The result is that the head 25 slows gradually down. As soon as the speed of the head 25 decreases, the gear 22 becomes the fulcrum of the planetary gearing with the result that the gear 21 is caused to rotate in the direction of rotation of the gear 22. In this manner, however, the head 24 starts to move, its speed increasing gradually until it is substantially equal to that of the head 25. When the two heads move at substantially the same speed, the driven shaft 17 rotates at approximately the speed of the driving shaft. From this it appears that the speed of the driven member gradually increases from zero to substantially that of the driving member without shock or jar.

It is to be noted that the power consumed in slowing down the head 25 is converted into useful work, as it has a tendency to increase the speed of the driven shaft.

Attention is called to the fact that, while herein a planetary gearing of a particular type has been described in connection with means for causing automatically one of its elements to become a fulcrum, any other gearing may be used without departing from the invention, which lies mainly in connecting the driving and driven shafts by a train of gears, in combination with means for automatically changing the relative rotative speeds of the elements of the train so that the power consumed in changing the speed of one or more of the elements of the train is converted at the same time into useful work for speeding up the driven shaft.

It will be observed from the foregoing that the transmission of power between the driving and driven members of the mechanism takes place through the planetary gearing, the two pump impellers acting solely as a hydraulic clutch. They are designed in the form of impellers in order to obtain a continuous circulation of the actuating liquid, whereby the liquid is, due to centrifugal force, caused to move in one of the same outward and to be thrown against the vanes of the other, which act as an abutment. The member, the vanes of which act as an abutment, on the other hand, is designed as an impeller to permit the liquid to flow therein back to the other member.

The modification illustrated in Fig. 3 of the drawings differs mainly from the one above described in that its carrier 19 is adapted to be disengaged from the casing 10. If so disengaged, no power will be transmitted from the driving shaft to the driven shaft. In this instance, the carrier is made in the form of a sleeve 28, that is drawn over the driven shaft and provided with a web 29, to which the spindles 18 are secured. To this sleeve is rigidly attached a conical clutch member 30, that reaches within a similarly shaped element 31 upon the casing 10, said element 31 being provided with a brake lining 32. A spring 33 serves to hold the members 30 and 31 in clutching engagement. The shaft 17 is slidable in the direction of its longitudinal axis, and provided within the casing 10 with a boss 34, that reaches into a recess 35 in the casing to guide the sliding motion of the said driven shaft.

When the driven shaft 17 is shifted in the direction of the arrow shown in Fig. 3 of the drawings, it moves in the same direction the carrier 19 and the clutch member 30 connected therewith, thereby disengaging the said clutch member from the element 31 coöperating therewith, or in other words disconnecting the gear carrier from the casing of the apparatus. When the elements are in these positions the driven shaft will remain stationary or will be caused to come to rest, no matter at what speed the driving shaft be rotated.

What I claim is:

1. In a power transmitting apparatus, the combination with driving and driven shafts, of a gearing connecting the same, and an automatically acting hydraulic clutch for causing one element of the gearing to become a fulcrum for certain other elements thereof, said clutch including two members, one of said members being connected with the element which becomes a fulcrum and the other one with said driven shaft.

2. In a power transmitting apparatus, the combination with driving and driven shafts, of a planetary gearing connecting the same, and an automatically acting hydraulic clutch for causing one element of the gearing to become a fulcrum for certain other elements thereof, said clutch including two members, one of said members being connected with the element which becomes a fulcrum and the other one with said driven shaft.

3. In a power transmitting apparatus, the combination with driving and driven shafts, of a gearing connecting the same, and an automatically acting hydraulic clutch for changing the normal speed of one element of the gear in relation to the other elements thereof, whereby the same is caused to become a fulcrum for certain other elements of the gearing, said clutch including two members, one of said members being connected with the element which becomes the fulcrum and the other one with said driven shaft.

4. In a power transmitting apparatus, the combination with driving and driven shafts, of a planetary gearing connecting the same, and an automatically acting hydraulic clutch for changing the normal speed of one element of the gear in relation to the other elements thereof, whereby the same is caused to become a fulcrum for certain other elements of the gearing, said clutch including two members, one of said members being connected with the element which becomes the fulcrum and the other one with said driven shaft.

5. In a power transmitting apparatus, the combination with driving and driven shafts, of a gearing connecting the same, and means for causing automatically one element of the gearing to become the fulcrum for certain other elements thereof, said last named means being connected with said gearing so as to cause the power consumed in producing the fulcrum to be converted into useful work for aiding the motion of said driven shaft.

6. In a power transmitting apparatus, the combination with driving and driven shafts, of a planetary gearing connecting the same, and means for causing automatically one element of the gearing to become the fulcrum for certain other elements thereof, said last named means being connected with said gearing so as to cause the power consumed in producing the fulcrum to be converted into useful work for aiding the motion of said driven shaft.

7. In a power transmitting apparatus, the combination with driving and driven shafts, of a gearing connecting the same, and means for changing automatically the normal speed of one element of the gearing in relation to the other elements thereof, whereby the same is caused to become a fulcrum for certain other elements of the gearing, said last named means being connected with said gearing so as to cause the power consumed in producing the fulcrum to be converted into useful work for aiding the motion of said driven shaft.

8. In a power transmitting apparatus, the combination with driving and driven shafts, of a planetary gearing connecting the same, and means for changing automatically the normal speed of one element of the gearing in relation to the other elements thereof, whereby the same is caused to become a fulcrum for certain other elements of the gearing, said last named means being connected with said gearing so as to cause the power consumed in producing the fulcrum to be converted into useful work for aiding the motion of said driven shaft.

9. In a power transmitting apparatus, the combination with driving and driven shafts, of a gearing connecting the same, and hydraulic means for causing automatically one element of the gearing to become the fulcrum for certain other elements thereof, said last named means being connected with said gearing so as to cause the power consumed in producing the fulcrum to be converted into useful work for aiding the motion of said driven shaft.

10. In a power transmitting apparatus, the combination with driving and driven shafts, of a planetary gearing connecting the same, and hydraulic means for causing automatically one element of the gearing to become the fulcrum for certain other elements thereof, said last named means being connected with said gearing so as to cause the power consumed in producing the fulcrum to be converted into useful work for aiding the motion of said driven shaft.

11. In a power transmitting apparatus, the combination with driving and driven shafts, of a gearing connecting the same, and hydraulic means for changing automatically the normal speed of one element of the gearing in relation to the other elements thereof, whereby the same is caused to become a fulcrum for certain other elements of the gearing, said last named means being connected with said gearing so as to cause the power consumed in producing the fulcrum to be converted into useful work for aiding the motion of said driven shaft.

12. In a power transmitting apparatus, the combination with driving and driven shafts, of a planetary gearing connecting the same, and hydraulic means for changing automatically the normal speed of one element of the gearing in relation to the other elements thereof, whereby the same is caused to become a fulcrum for certain other elements of the gearing, said last named means being connected with said gearing so as to cause the power consumed in producing the fulcrum to be converted into useful work for aiding the motion of said driven shaft.

13. In a power transmitting apparatus, the combination with driving and driven shafts, of a gearing connecting the same, and an automatically acting clutch for causing one element of the gearing to become a fulcrum for certain other elements thereof, said clutch being connected with said gearing so as to cause the power consumed in producing the fulcrum to be converted into useful work for aiding the motion of said driven shaft.

14. In a power transmitting apparatus, the combination with driving and driven shafts, of a planetary gearing connecting the same, and an automatically acting clutch for causing one element of the gearing to become a fulcrum for certain other elements thereof, said clutch being connected with said gearing so as to cause the power consumed in producing the fulcrum to be converted into useful work for aiding the motion of said driven shaft.

15. In a power transmitting apparatus, the combination with driving and driven shafts, of a gearing connecting the same, and an automatically acting clutch for changing the normal speed of one element of the gearing in relation to the other elements thereof, whereby the same is caused to become a fulcrum for certain other elements of the gearing, said clutch being connected with said gearing so as to cause the power consumed in producing the fulcrum to be converted into useful work for aiding the motion of said driven shaft.

16. In a power transmitting apparatus, the combination with driving and driven shafts, of a planetary gearing connecting the same, and an automatically acting clutch for changing the normal speed of one element of the gearing in relation to the other elements thereof, whereby the same is caused to become a fulcrum for certain other elements of the gearing, said clutch being connected with said gearing so as to cause the power consumed in producing the fulcrum to be converted into useful work for aiding the motion of said driven shaft.

17. In a power transmitting apparatus, the combination with driving and driven shafts, of a gearing connecting the same, and an automatically acting hydraulic clutch for causing one element of the gearing to become a fulcrum for certain other elements thereof, said clutch being connected with said gearing so as to cause the power consumed in producing the fulcrum to be converted into useful work for aiding the motion of said driven shaft.

18. In a power transmitting apparatus, the combination with driving and driven shafts, of a planetary gearing connecting the same, and an automatically acting hydraulic clutch for causing one element of the gearing to become a fulcrum for certain other elements thereof, said clutch being connected with said gearing so as to cause the power consumed in producing the fulcrum to be converted into useful work for aiding the motion of said driven shaft.

19. In a power transmitting apparatus, the combination with driving and driven shafts, of a gearing connecting the same, and an automatically acting hydraulic clutch for changing the normal speed of one element of the gearing in relation to the other elements thereof, whereby the same is caused to become a fulcrum for certain other elements of the gearing, said clutch being connected with said gearing so as to cause the power consumed in producing the fulcrum to be converted into useful work for aiding the motion of said driven shaft.

20. In a power transmitting apparatus, the combination with driving and driven shafts, of a planetary gearing connecting the same, and an automatically acting hydraulic clutch for changing the normal speed of one element of the gearing in relation to the other elements thereof, whereby the same is caused to become a fulcrum for certain other elements of the gearing, said clutch being connected with said gearing so as to cause the power consumed in producing the fulcrum to be converted into useful work for aiding the motion of said driven shaft.

21. In a power transmitting apparatus, the combination with driving and driven shafts, of a gearing connecting the same, and an automatically acting clutch for causing one element of the gearing to become a fulcrum for certain other elements thereof, said clutch including two members, one of said members being connected with the element which becomes a fulcrum and the other one with said driven shaft.

22. In a power transmitting apparatus, the combination with driving and driven shafts, of a planetary gearing connecting the same, and an automatically acting clutch for causing one element of the gearing to become a fulcrum for certain other elements thereof, said clutch including two members, one of said members being connected with the element which becomes a fulcrum and the other one with said driven shaft.

23. In a power transmitting apparatus, the combination with driving and driven shafts, of a gearing connecting the same, and an automatically acting clutch for changing the normal speed of one element of the gear in relation to the other elements thereof, whereby the same is caused to become a fulcrum for certain other elements of the gearing, said clutch including two members, one of said members being connected with the element which becomes the fulcrum and the other one with said driven shaft.

24. In a power transmitting apparatus, the combination with the driving and driven shafts, of a planetary gearing connecting the same, and an automatically acting clutch for changing the normal speed of one element of the gear in relation to the other elements thereof, whereby the same is caused to become a fulcrum for certain other elements of the gearing, said clutch including two members, one of said members being connected with the element which becomes the fulcrum and the other one with said driven shaft.

25. In a power transmitting apparatus, the combination with driving and driven shafts, of a casing rigidly connected to said driving shaft and containing a liquid, a planetary gearing, one member of said gearing being secured to said driven shaft, and at least another one to said casing, a hydraulic clutch within said casing including two members, one of which is carried by said driven shaft and the other one by another member of said gearing.

26. The combination with a planetary gearing, of a clutch actuated thereby, said clutch serving to cause one element of the gearing to become a fulcrum for certain other elements thereof and also to increase the momentum of the driven member of the gearing.

27. The combination with a planetary gearing, of a hydraulic clutch actuated thereby, said clutch serving to cause one element of the gearing to become a fulcrum for certain other elements thereof and also to increase the momentum of the driven member of the gearing.

28. The combination with a planetary gearing including driving and driven members and an intermediate fulcrum member, of a hydraulic clutch connected with said gearing, said clutch including two elements one of which is connected with the driven member and the other one with the fulcrum member of the gearing.

29. The combination with a planetary gearing including driving and driven members and an intermediate fulcrum member, of a clutch connected with said gearing, said clutch including two elements one of which is connected with the driven member and the other one with the fulcrum member of the gearing.

30. In a power transmitting apparatus, the combination with driving and driven shafts, of a planetary gearing associated therewith, said gearing including driving and driven members and an intermediate fulcrum member, the driving member being connected with said driving shaft and the driven member of the said gearing with said driven shaft, a hydraulic clutch connected with said gearing, said clutch including two elements, one of which is connected with said driven shaft and the other one with the fulcrum member of said gearing.

31. In a power transmitting apparatus, the combination with driving and driven shafts, of a planetary gearing associated therewith, said gearing including driving and driven members and an intermediate fulcrum member, the driving member being connected with said driving shaft and the driven member of the said gearing with said driven shaft, a clutch connected with said gearing, said clutch including two elements, one of which is connected with said driven shaft and the other one with the fulcrum member of said gearing.

Signed at New York, in the county of New York, and State of New York, this 26th day of July, A. D. 1916.

CARLTON R. RADCLIFFE.